US 6,735,595 B2

(12) United States Patent
Gobeille et al.

(10) Patent No.: US 6,735,595 B2
(45) Date of Patent: May 11, 2004

(54) DATA STRUCTURE AND STORAGE AND RETRIEVAL METHOD SUPPORTING ORDINALITY BASED SEARCHING AND DATA RETRIEVAL

(75) Inventors: Robert C. Gobeille, Fort Collins, CO (US); Douglas L Baskins, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 09/725,373

(22) Filed: Nov. 29, 2000

(65) Prior Publication Data

US 2002/0107860 A1 Aug. 8, 2002

(51) Int. Cl.$^7$ .............................................. G06F 17/30
(52) U.S. Cl. ..................................... 707/102; 707/104.1
(58) Field of Search ............................ 707/1, 3, 4, 201, 707/206, 100, 101, 102, 104.1; 711/1, 170, 202; 715/506, 511; 370/238, 256, 400, 455

(56) References Cited

U.S. PATENT DOCUMENTS

| | | | | |
|---|---|---|---|---|
| 5,530,957 A | * | 6/1996 | Koenig | 707/100 |
| 5,557,786 A | * | 9/1996 | Johnson, Jr. | 707/101 |
| 5,701,467 A | | 12/1997 | Freeston | |
| 5,829,004 A | | 10/1998 | Au | |
| 5,930,805 A | * | 7/1999 | Marquis | 707/201 |
| 5,974,411 A | | 10/1999 | McCool et al. | |
| 5,983,232 A | * | 11/1999 | Zhang | 707/102 |
| 5,987,468 A | | 11/1999 | Singh et al. | |
| 6,041,053 A | | 3/2000 | Douceur et al. | |
| 6,055,539 A | * | 4/2000 | Singh et al. | 707/102 |
| 6,067,574 A | | 5/2000 | Tzeng | |
| 6,070,164 A | * | 5/2000 | Vagnozzi | 707/100 |
| 6,470,344 B1 | | 10/2002 | Kothuri et al. | |
| 6,505,206 B1 | | 1/2003 | Tikkanen et al. | |
| 6,675,169 B1 | * | 1/2004 | Bennett et al. | 707/101 |

OTHER PUBLICATIONS http://www.geocities.com/SiliconValley/4942/arrays.html—Dynamic Array Routines (6 pages), Printed Jul. 18, 2001.

Merrett, T. H., Heping Shang, and Xiaoyan Zhao. "Database Structures, Based on Tries, for Text, Spatial, and General Data." School of COmputer Science, McGill University. 1–11, (no date).

Bentley, Jon L. "Multidimensional Binary Search Trees Used for Associative Searching." Association for Computing Machinery, Inc. vol. 18, No. 9, (Sep. 1975), 509–517.

Jacquet, Philippe and Wojciech Szpankowski. "What we can learn about Suffix Trees from Independent Tries." WADS. (Aug. 1991), 228–239.

(List continued on next page.)

Primary Examiner—Charles Rones

(57) ABSTRACT

A data structure and related data storage and retrieval method rapidly provide a count of elements stored or referenced by a hierarchical structure of ordered elements (e.g., a tree), access to elements based on their ordinal value in the structure, and identification of the ordinality of elements. In an ordered tree implementation of the invention, a count of elements stored in each subtree is stored, i.e., the cardinality of each subtree is stored either at or associated with a higher level node pointing to that subtree or at or associated with the head node of the subtree. In addition to data structure specific requirements (e.g., creation of a new node, reassignment of pointers, balancing, etc.) data insertion and deletion includes steps of updating affected counts. Elements may be target data itself (e.g., data samples, prime numbers); keys or indices associated with target data (e.g., social security numbers of employees, product numbers and codes, etc. uses to reference associated data records, etc.); or internal memory pointer to keys or data stored external to the data structure. The invention is applicable to varied hierarchical storage structures including, for example, binary trees, AVL trees (height-balanced binary trees), b-trees, etc. (population based structures) and digital trees (i.e., tries—expanse based structures).

20 Claims, 13 Drawing Sheets

OTHER PUBLICATIONS

Nilsson, Stefan and Matti Tikkanen. "An experimental study of Compression Methods for dynamic Tries." 1–21, (no date).

Martinez, Conrad, et al. "Partial match queries in relaxed multidimensional search trees." Austrian–Spanish Scientific Exchange Program. (Sep. 28, 1998), 1–24.

Rais, Bonita, et al. "Typical Behavior of Patricia Tries." Allerton Conference on Communications, Control, and Computing. (Oct. 1990), 924–925.

Kirschenhofer, Peter, et al, "Do we really need to Balance Patricia Tries?" National Science Foundation, 302–316, (no date).

Procopiuc, Octavian, "Data Structures for Spatial Systems," (May 12, 1997), 1–20.

Horowitz, Ellis and Sahni Sartaj, "Fundamentals of Data Structure in Pascal," W.H. Freeman and Company, 4th Ed., New York, (1994) 582–595.

Knuth, Donald E., "The Art of Computer Programming," Addison–Wesley Publishing Company, Reading, MA, (1973) 490–493.

Sedgewick, Robert. "Algorithms in C," Addison–Wesley Publishing Company, Reading, MA, (1990) 245–258, 265–271, 373–386.

Acharya, Anurag, Huican Zhu, and Kai Shen, "Adaptive Algorithms for Cache–efficeint Trie Search." University of California, Santa Barbara, CA, 1–11, (no date).

Bentley, Jon and Robert Sedgewick. "Fast Algorithms for Sorting and Searching Strings," 360–369, (no date).

Bentley, Jon and Robert Sedgewick, "Ternary Search Trees," Dr. Dobb's Journal, (Apr. 1998), 1–8.

Ai–suw aiyel, M. and Ellis Horowitz, "Algorithms for Trie Compaction," ACM Transactions on Database Systems, vol. 9, No. 2. (Jun., 1984), 243–263.

Doeringer, Willibald, Gunter Karjoth and Mahdi Nassehi, "Routing on Longest–Matching Prefixes," IEEE/ACM Transactions on Networking, vol. 4, No. 1, (Feb. 1996), 86–97.

Reznik, Yurily, A., "Some results on Tries with Adaptive Branching," 6th Annual International Conference, COCOON (2000), 148–158.

Knott, Gary D., "Fixed–Bucket Binary Storage Trees," Journal of Algorithms 3, (1982), 276–287.

Luccio, Fabrizio, Mirelle Regnier, Rene Schott, "Discs and Other Related Data Structure," Workshop WADS, (Aug. 1989), 192–205.

Clement, J. P. Flajolet, and B. Vallee, "Dynamical Sources in Information Theory: A General Analysis of Trie Structures," Algorithmica, (2001), 307–369.

* cited by examiner

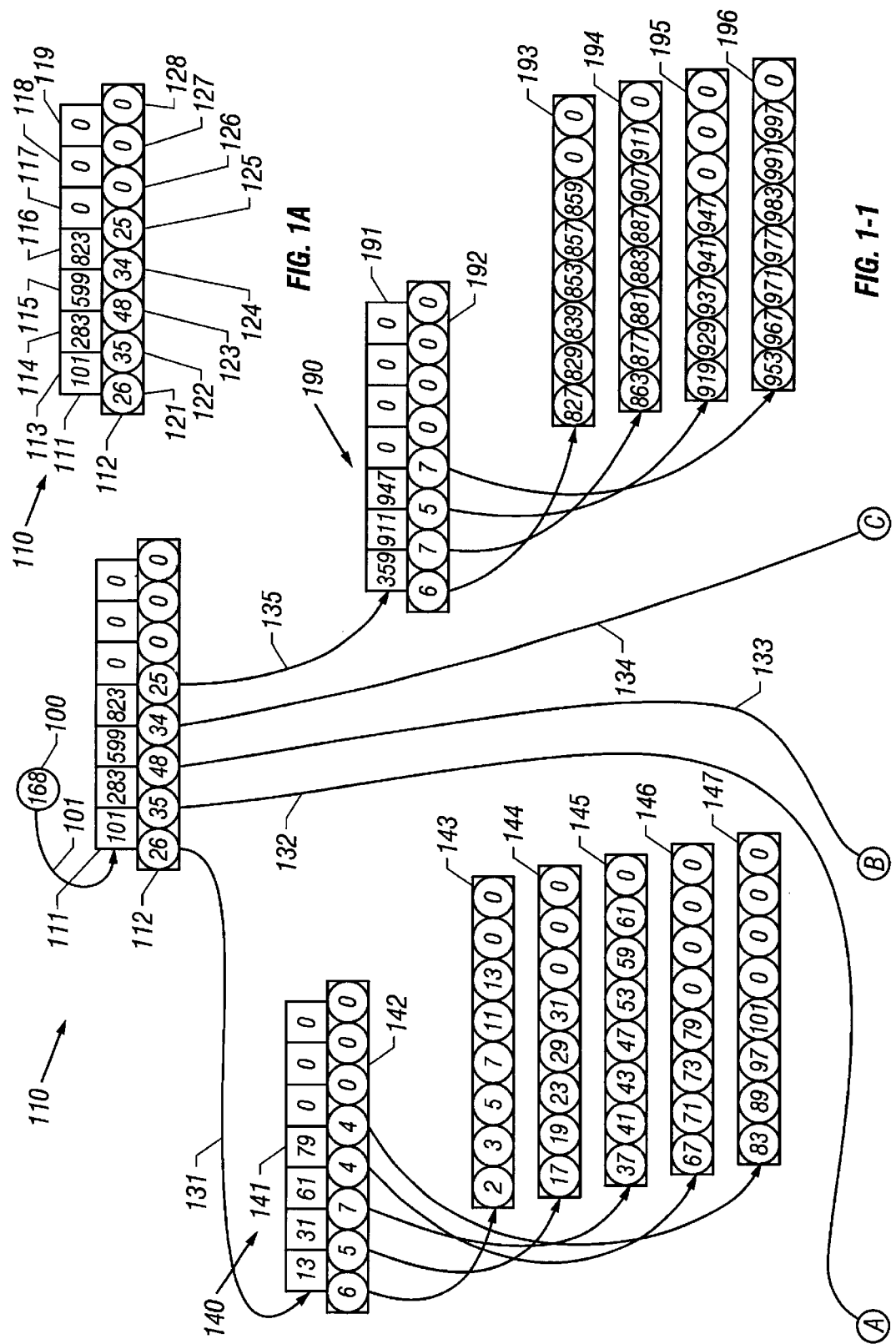

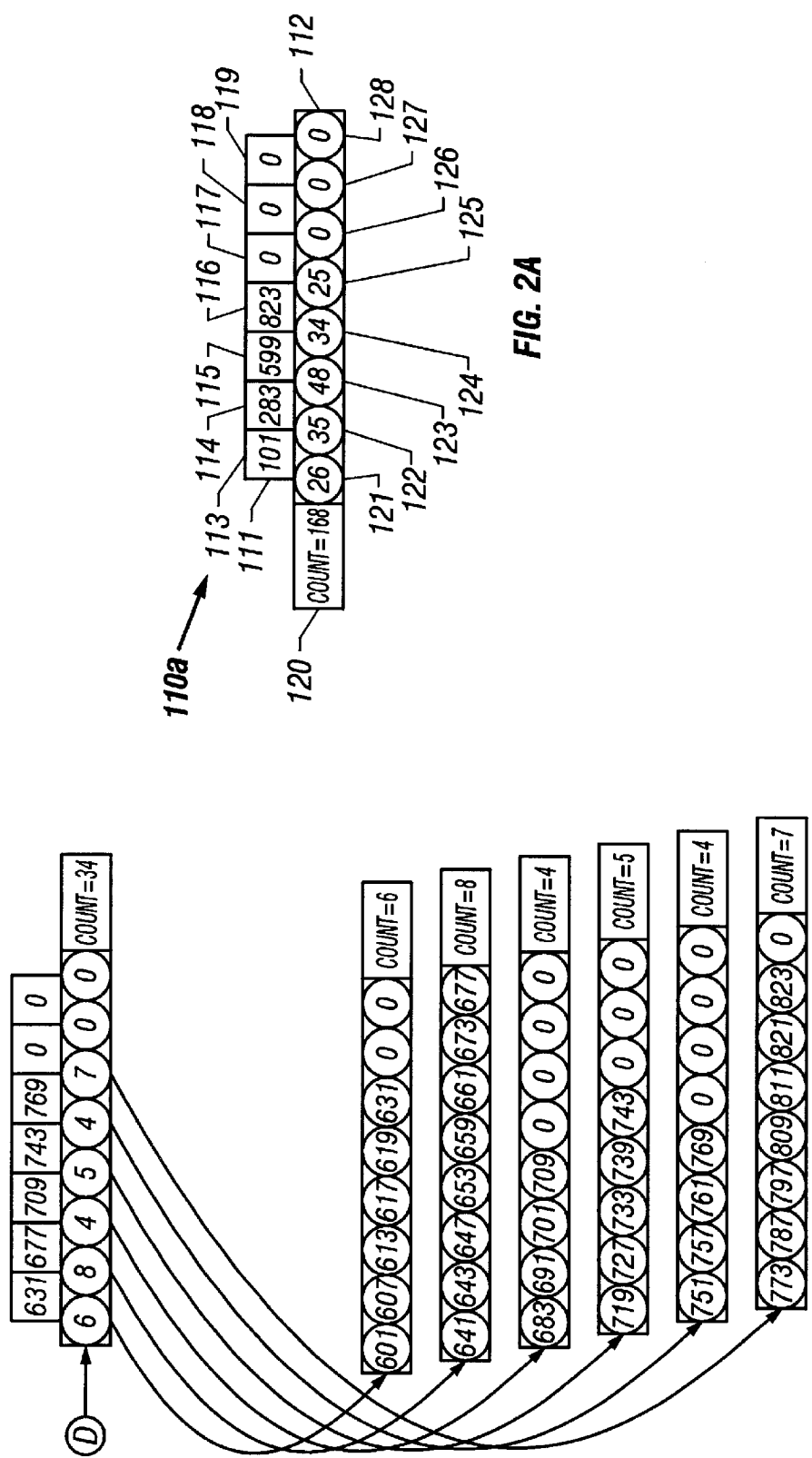

DATA STRUCTURE AND STORAGE AND RETRIEVAL METHOD SUPPORTING ORDINALITY BASED SEARCHING AND DATA RETRIEVAL

BACKGROUND

Computer processors and associated memory components continue to increase in speed. As hardware approaches physical speed limitations, however, other methods for generating appreciable decreases in data access times are required. One method is via effective data management, achieved by the appropriate choice of data structure and related storage and retrieval algorithms. For example, various prior art data structures and related storage and retrieval algorithms have been developed for data management including arrays, hashing, binary trees, AVL trees (height-balanced binary trees), b-trees, and skiplists. An enhanced storage structure is further described in pending U.S. patent application Ser. No. 09/457,164, filed Dec. 8, 1999, entitled "A Fast, Efficient, Adaptive, Hybrid Tree", assigned in common with the instant application and incorporated herein by reference in its entirety.

While such data structures accommodate storage, searching and retrieval of data, they do not readily support other operations including, for example, providing a count of a number of data entries or keys (e.g., indices) falling within selected ranges or "expanses" of the structure. Nor do such constructs readily support identification of keys or indices based on their ordinal value among the stored data, or the retrieval of data based on an ordinal value or range of ordinal values of their associated keys or indices. Instead, these prior art structures require partial or complete traversal of the data to provide a count of values satisfying specified ordinal criteria. Accordingly, a need exists for a data structure which supports identification of keys and indices and data based on ordinal values within a set and further provides a count of values based on ranges of key (or index) values.

SUMMARY OF THE INVENTION

The present invention is a data structure and related data storage and retrieval method that rapidly provides a count of elements stored or referenced by a hierarchical structure of ordered elements (e.g., a tree), access to elements based on their ordinal value in the structure, and identification of the ordinality of elements. In an ordered tree implementation of the invention, a count of elements stored in each subtree is stored, i.e., the cardinality of each subtree is stored either at or associated with a higher level node pointing to that subtree or at or associated with the head node of the subtree. In addition to data structure specific requirements (e.g., creation of a new node, reassignment of pointers, balancing, etc.) data insertion and deletion includes steps of updating affected counts. Elements may be target data itself (e.g., data samples, prime numbers); keys or indices associated with target data (e.g., social security numbers of employees, product numbers and codes, etc. used to reference associated data records, etc.); or internal memory pointers to keys and/or data stored outside the data structure. While the invention is applicable to varied hierarchical storage structures including, for example, binary trees, AVL trees (height-balanced binary trees), b-trees, etc. (population based structures) and digital trees (i.e., tries—expanse based structures), a preferred embodiment of the invention incorporates a hybrid tree structure as described and set forth in above referenced U.S. Patent Application.

According to an aspect of the invention, a computer memory is configured to store data for access by an application program being executed on a data processing system. Stored in memory is a hierarchical data structure, the data structure storing an ordered set of keys. The structure includes a root node and a plurality of first level data structures, a subset of the ordered set of keys uniquely associated with respective ones of the first level data structures. Each of the first level data structures have associated therewith a count value representing a number of entries of an associated one of the subsets. The entries may correspond to the keys, particularly in those structures wherein keys must be unique.

According to an aspect of the invention, the hierarchical data structure may be a digital tree, or "trie" or similar "expanse" based data storage structure. Conversely, a feature of the invention includes "population" based structures, such as b-trees and the various types of binary trees.

According to another feature of the invention, the count values are stored in memory in association with the root node, the root node including addresses of each of the first level data structures. Each of the addresses may stored in memory in association with the root node as a pointer originating at the root node and terminating at a respective one of the first level data structures.

According to another feature of the invention, each of the first level structures further includes a plurality of directors (e.g., pointers or directed edges) to respective second level data structures and/or nodes. The first level data structures may further include interior nodes referencing other nodes and leaf nodes containing or referencing the keys.

According to another aspect of the invention, a computer memory for storing data for access by an application program being executed on a data processing system includes a hierarchical data structure stored in memory. The data structure stores an ordered set of keys and includes a head node addressing each of a first plurality of first level data structures. Each of the first level data structures, in turn, address respective second level data structures. First level nodes of the ordered set of keys are uniquely associated with respective ones of the first level data structures while second level nodes are uniquely associated with respective ones of the second level data structures. Each of the first and second level data structures have associated therewith a count representing a number of the keys stored in respective ones of the structures.

According to a feature of the invention, each of the first level nodes includes references to at least two of the second level nodes. Further, the counts may be associated with a number of the keys referenced by respective ones of the references.

According to another feature of the invention, the references include addresses of the second level nodes in the memory. For example, the references may be in the form of pointers to the second level nodes.

According to another aspect of the invention, a method of storing data in a computer memory includes storing ordered sets of keys into a plurality of data structures. Addresses of the data structures are stored in a root node and counts of one of the keys in each of the data structures are stored in association with each of the addresses.

According to a feature of a method according to the invention, a step of determining an ordinality of one of the keys includes adding at least one of the counts to an ordinality of the key with respect to others of the keys commonly stored in one of the data structures.

According to another aspect of the invention wherein the data structures include at least one first level data structure referencing a plurality of second level data structures, the method further includes a step of distributing the keys among the plurality of second data structures and storing in the first level data structure counts of the keys in each of the second level data structures.

BRIEF DESCRIPTION OF THE DRAWINGS

The invention will be better understood from a reading of the following detailed description taken in conjunction with the drawing in which like reference designators are used to designate like elements, and in which:

FIGS. 1-1, 1-2, and 1a are diagrams of a b-tree including key counts stored in respective subtree root nodes, each indicator associated with a number of keys present each of the "pointed-to", lower level sub-subtrees;

FIGS. 2-1, 2-2, 2-3, and 2a are diagrams of a b-tree including key counts stored in respective subtree root nodes, each indicator associated with a number of keys present in the subtree;

FIGS. 3-1, 3-2, 3-3, and 3a are diagrams of a b-tree including key counts stored in respective subtree root nodes, a top indicator providing a total count of keys referenced by the subtree, individual indicators providing counts of sub-subtrees pointed to by the root node;

FIGS. 6-1 and 6-2 are a diagram of a hybrid "Judy" tree structure including key counts stored in respective subtree root nodes, each indicator associated with a number of keys present in each of the "pointed-to", lower level sub-subtrees;

DETAILED DESCRIPTION

For ease of explanation and understanding, an index counting structure according to the invention is described with reference to several tree structures used to index and possibly store data in a memory. The memory can be any type of device and can be accessed by any type of computer or processor. However, it is understood that the scope of the invention is not limited to a particular data structure or type, or to any particular memory or processor type, except to the extent literally required by the appended claims. Thus, all embodiments of the present invention are given by way of example only and are not to be considered by way of limitation.

Figures 1, 2:
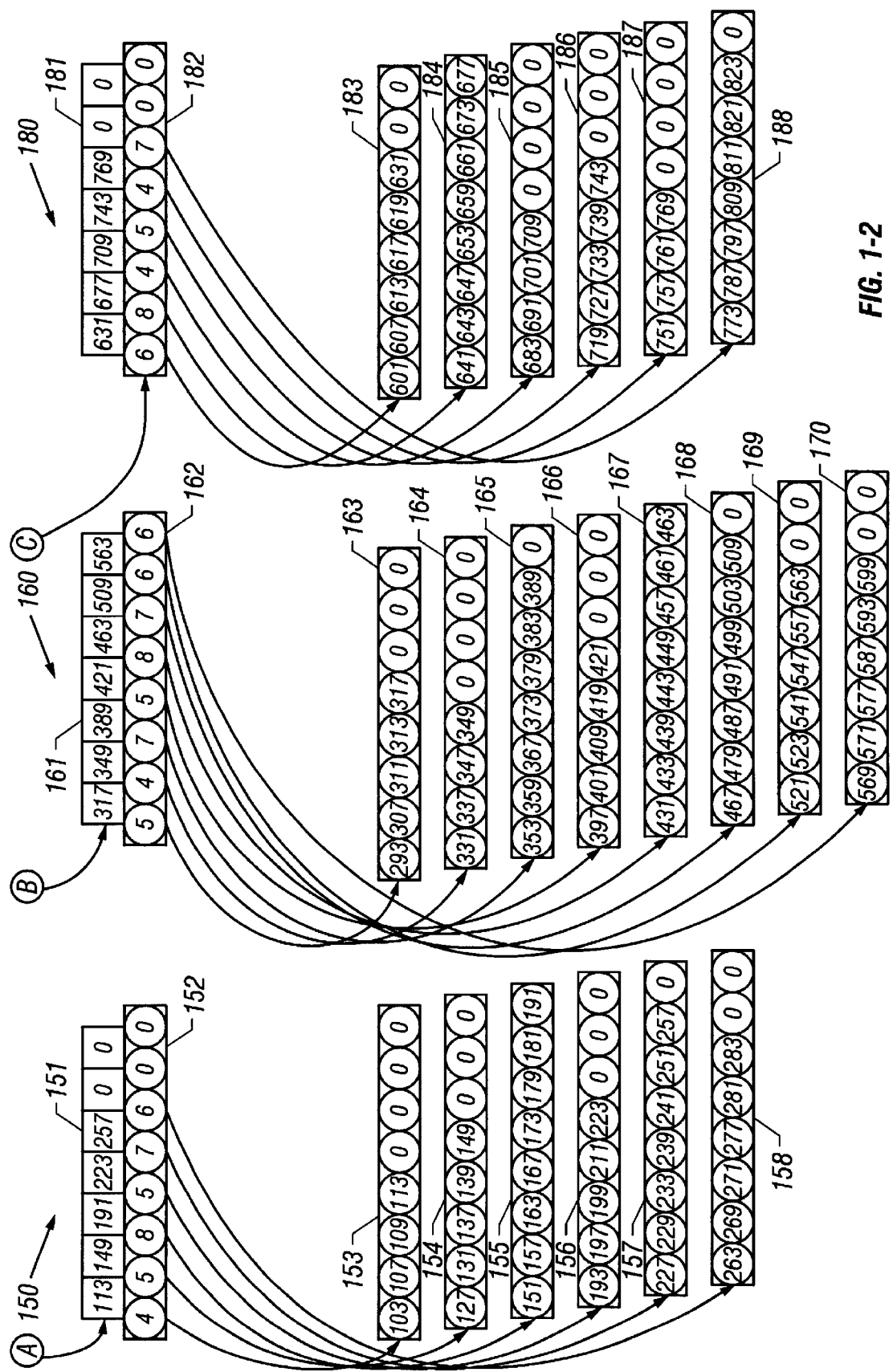
Figures 1, 2:
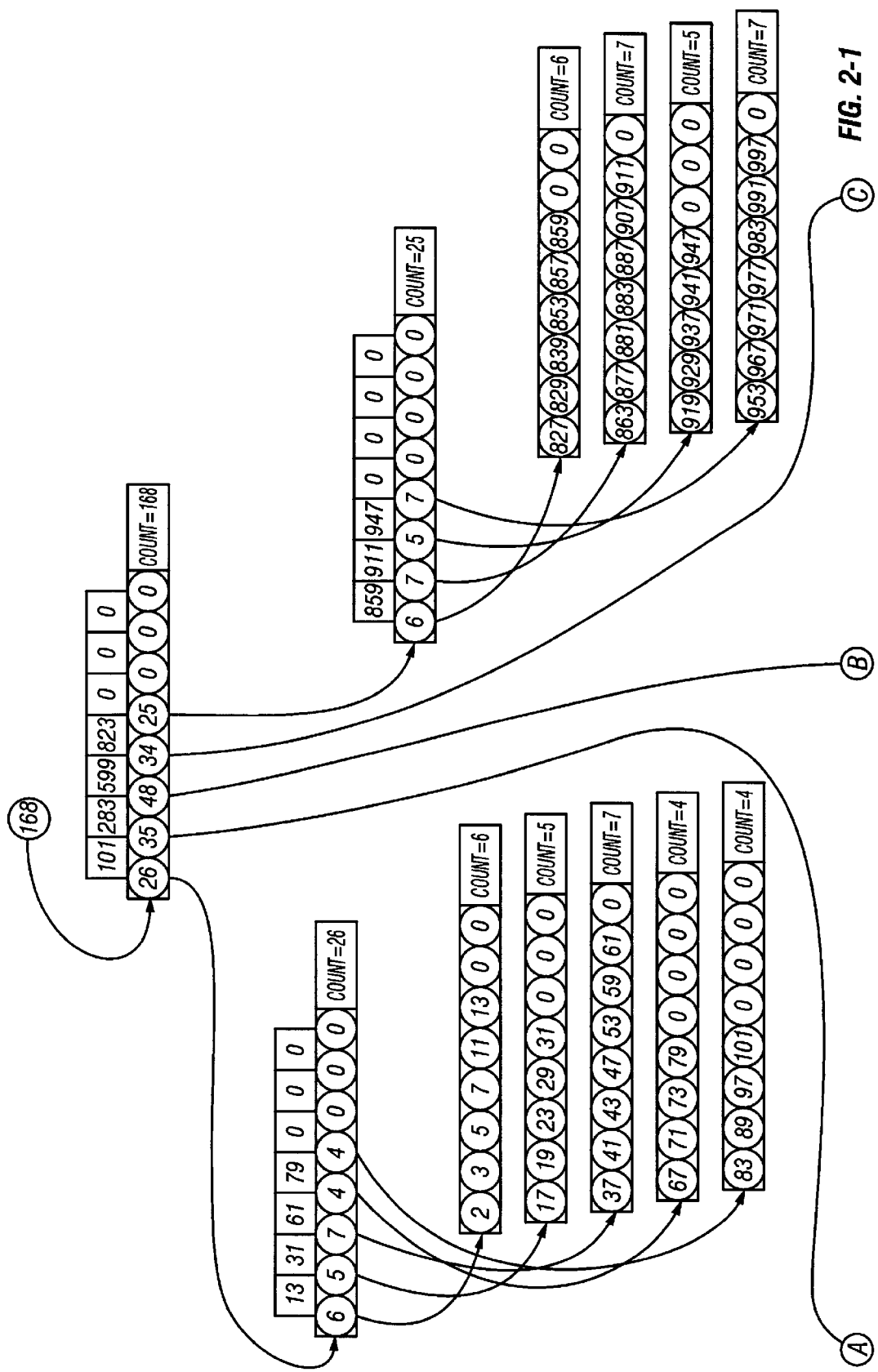
Figure 2:
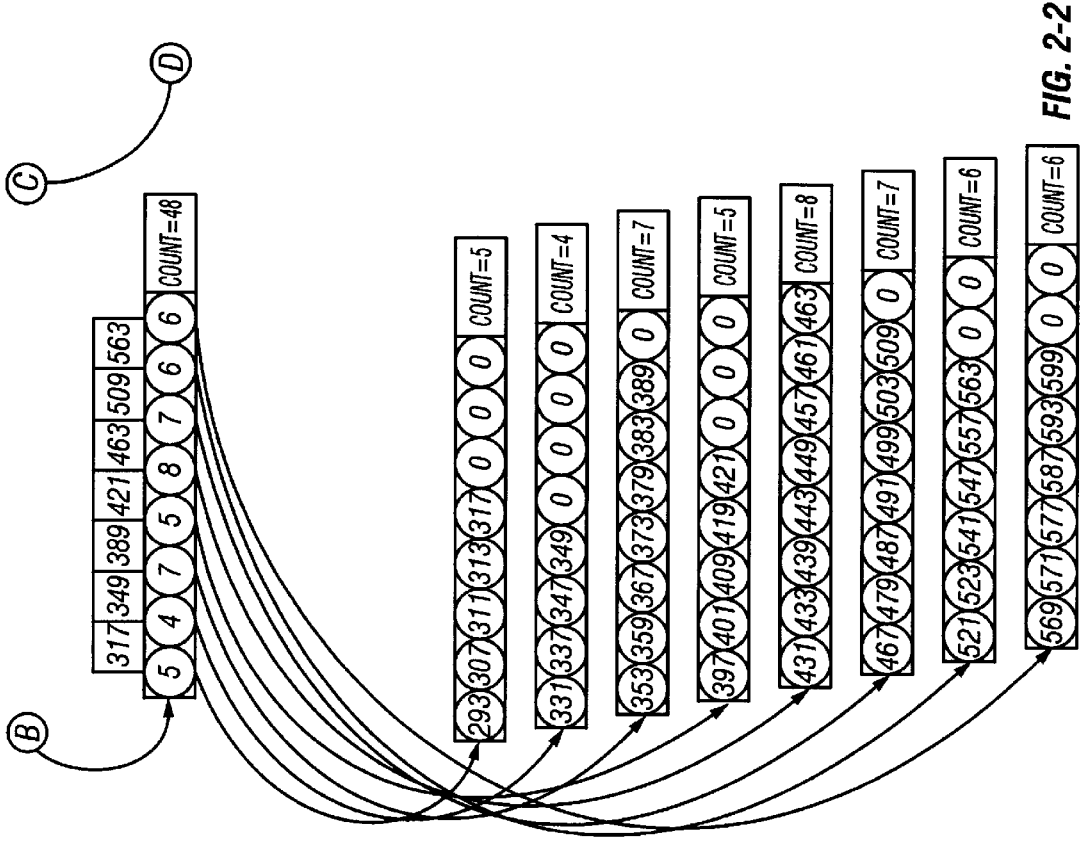
Figure 2:
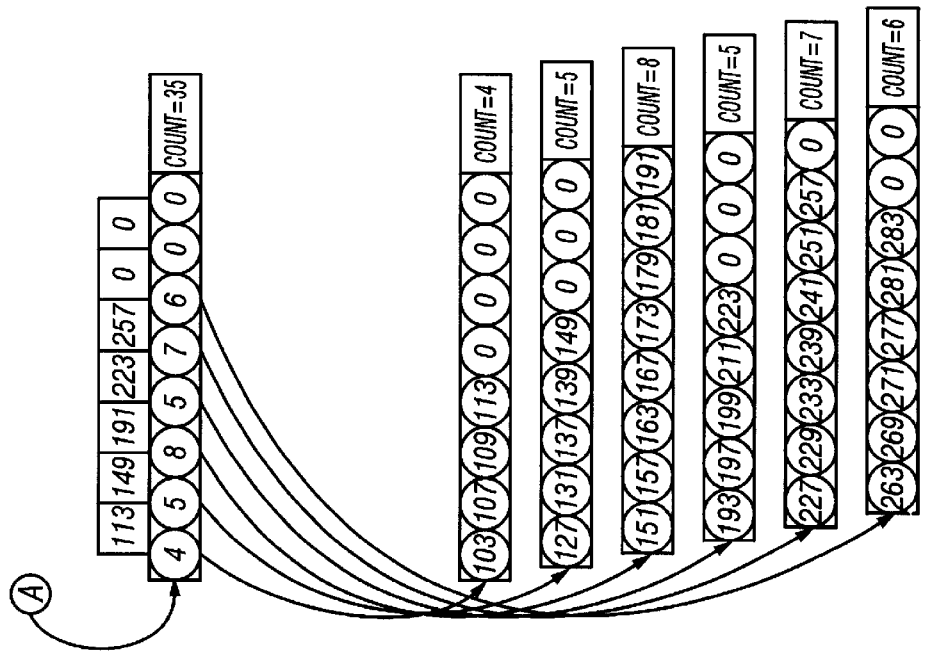

FIGS. 1-1 and 1-2 is a diagram of a "b-tree" including index counts stored in respective subtree root nodes, each count associated with a number of keys or entries present in each of the "pointed-to", lower level sub-subtrees. (Unless otherwise indicated, "root" node may refer to any interior node to the extent that such node is an initial or head node of a corresponding subtree.) Thus, associated with each pointer to a subtree is a count of the number of entries contained in that subtree or, if the pointer is to a leaf, then the number of entries in that leaf. In this example, the leaf nodes of the b-tree are populated with the 168 prime numbers that are less than 1000. Prime numbers are a particularly useful example of the invention to illustrate searching to determine the number of prime numbers within representative ranges and, conversely identifying ranges of prime numbers based on their ordinal values. Pointer 101 is associated with root node 100 used to access first level node 110. Associated with the originating "tail end" of pointer 101 at root node 100 is a count, in this case having a value of 168, indicating that pointer 101 is directed to a tree having 168 entries, i.e., the number of prime numbers less than 1000.

As is conventional for a b-tree, each interior node includes an array of pointers to other nodes and a list of separators or identifiers, each representing a dividing point between values stored in corresponding subtrees or leaf nodes of the tree. Often, as in the present example, the separators or identifiers are actually the keys representing the greatest entry within an associated node pointed to by an associated pointer. The present invention further includes, at the root and each interior node (i.e., at each node pointing to another node), a count of the total number of entries contained in the corresponding nodes (i.e., subtree) pointed to by the parent node. Thus, it is possible to determine the ordinality of an entry by keeping a running count of entry totals for subtrees bypassed during tree traversal. In the present example, it would only be necessary to keep track of the total number of entries stored in subtrees and leaf nodes corresponding to key ranges less than the target key. Similarly, it is possible to traverse the tree based on key ordinality (i.e, the ordered position of the key) by identifying a key at each node associated with a desired accumulated count.

For example, in the b-tree of FIGS. 1-1 and 1-2, root node 100 includes a pointer to a first level node 110 and a count of the number of entries in the tree. First level node 110 and each interior node 140, 150, 160, 180 and 190 includes an ordered array of up to eight pointers providing paths to children nodes, i.e., respective subtrees or terminal leaf nodes. Separator values corresponding to respective maximum key values contained in all but the last of the children nodes pointed to by a parent node are stored at the parent node as an ordered list. Also stored at each node, associated with respective pointers to children nodes, are count values representing the number of data entries or keys associated with the pointed-to nodes, i.e., within the referenced subtrees. Thus, node 110 accommodates a maximum of eight pointers to respective children nodes, i.e., subtrees or leaf nodes. As depicted, first level node 110 includes pointers 131-135 providing paths to respective second level interior nodes 140, 150, 160, 180 and 190. Each of these second level interior nodes is, in turn, the root node of a subtree. Pointers not being used are given a null value indicating such.

Associated with each assigned pointer 131–135 is a respective count value 121-125 representing the number of entries (in this case, prime numbers) contained within or pointed to by the subtree (or leaf node) addressed by the pointer. In the example, first level node 110 includes a first pointer 131 addressing interior child node 140. Separator 113 (FIG. 1a) indicates that the maximum key in or referenced by child node 140 has value of 101, meaning that keys less than or equal to 101 are stored in (or referenced by) the subtree having child node 140 as its root node. Associated with pointer 131 is count 121 having a value of 26 representing the total number of entries referenced by pointer 131. Thus, without traversing the subtree associated with pointer 131, its can be determined at parent node 110 that the subtree not only stores keys having values of 101 and less, but that there are a total of 26 entries in that subtree (i.e., a population count of 26).

Pointer 132, also originating at first level node 110, is associated with count 122 having a value of 35 indicating that the corresponding subtree stores or references a total of 35 entries. Since pointer 132 is bounded by separators 113 and 114, it can be further determined that the subtree includes entries having key values greater than 101 but less than or equal to 283, i.e., has an expanse of [101, 283) where "[" indicates a lower, not included limit and ")" indicates an upper included limit. Thus, in the present example, it can be determined at and from first level node 110 that there are a total of 35 prime numbers that are greater than 101 but less than or equal to 283. Similarly, pointers 133, 134 and 135 are associated with respective counts 123, 124 and 125 indicating that the pointers reference 48, 34 and 25 entries, respectively, and corresponding to primes greater than 283 (i.e., 293) through 599, primes greater than 599 (i.e., 601) through 823, and primes greater than 823 (i.e., 827) through the maximum value stored, in this case 997 stored in leaf node 196. Note that, as is conventional for b-trees, there is no indication of the minimum or maximum value stored in the tree, although this value might be stored in or associated with, for example, the root node or pointer to the root node. Having the minimum and maximum key value stored there would avoid tree traversal to determine these values.

Each second level node 140, 150, 160, 180 and 190 also includes up to eight pointers to lower level nodes (in this case, terminal leaf nodes); counts, associated with each assigned, non-nil pointer representing the total number of entries referenced by the pointer; and up to seven (i.e., N–1 where N is the maximum number of pointers per node) separator values indicating the maximum entry value stored in the respective "left" subtree. Thus, second level node 140 includes an array of pointers 142 and associated counts referencing terminal leaf nodes 143–147. Similarly, second level node 150 is the root node of a subtree including terminal leaf nodes 153–158; second level node 160 points to and maintains a count of the number of entries in terminal leaf nodes 163–170; node 180 partitions a total of 34 entries into six terminal leaf nodes 183–188, respectively storing six, eight, four, five, four and seven entries therein; and second level node 190 includes the final 25 primes less than 1000, i.e., 827–997; stored in terminal leaf nodes 193–196. Each of the second level nodes include counts of the number of entries contained in the pointed-to terminal leaf nodes so that indications to (i.e., traversal of) leaf nodes not containing the target key are avoided.

Operationally, conventional b-tree building, insertion, deletion and rebalancing must be augmented to include maintenance of the count values. Thus, counts must be increment at all nodes referencing a new entry as part of node (or leaf) creation. Similarly, deletion of a leaf (or key) requires a corresponding adjustment of the affected count values.

Figures 1, 3:
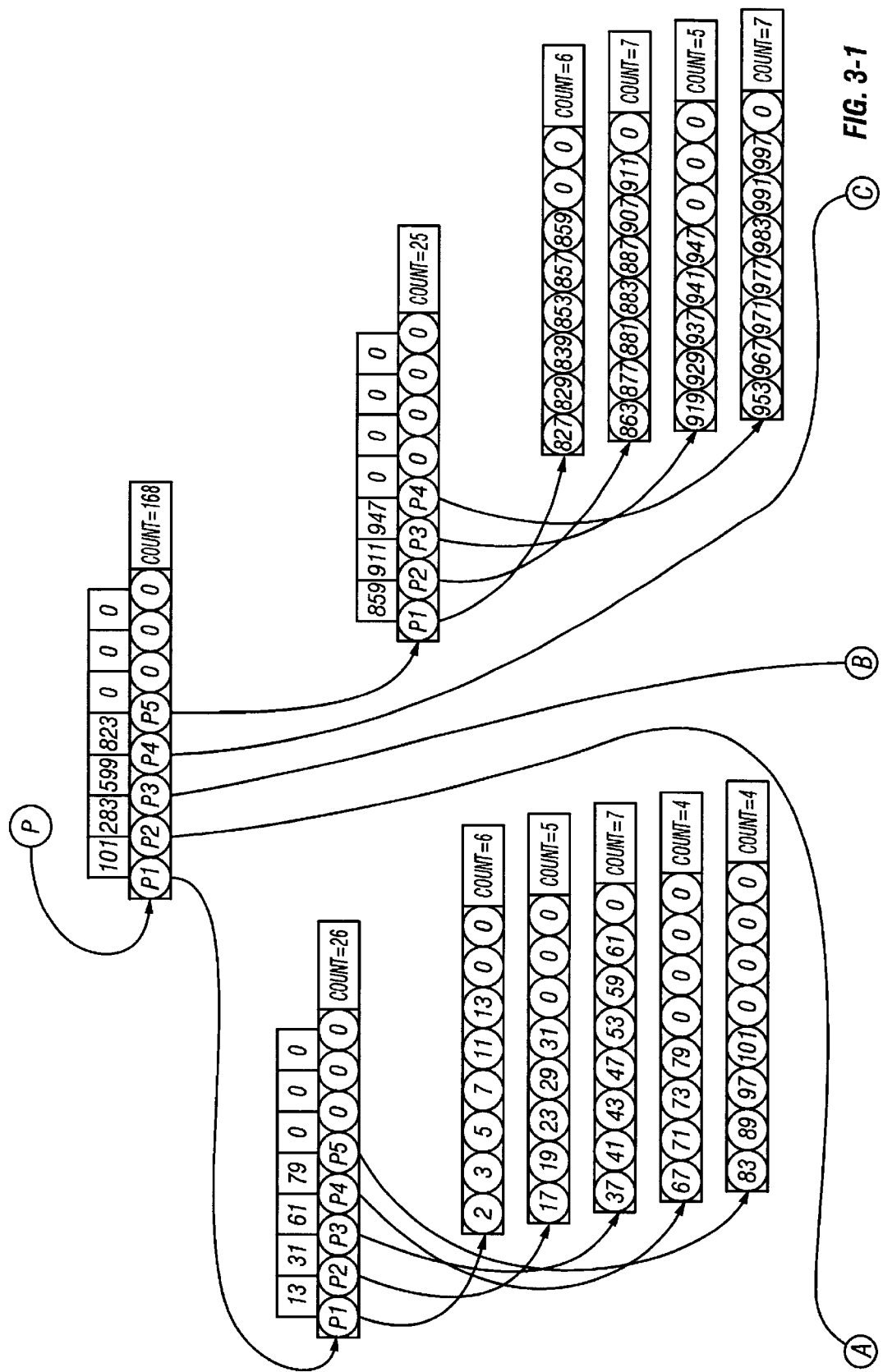
Figure 3:
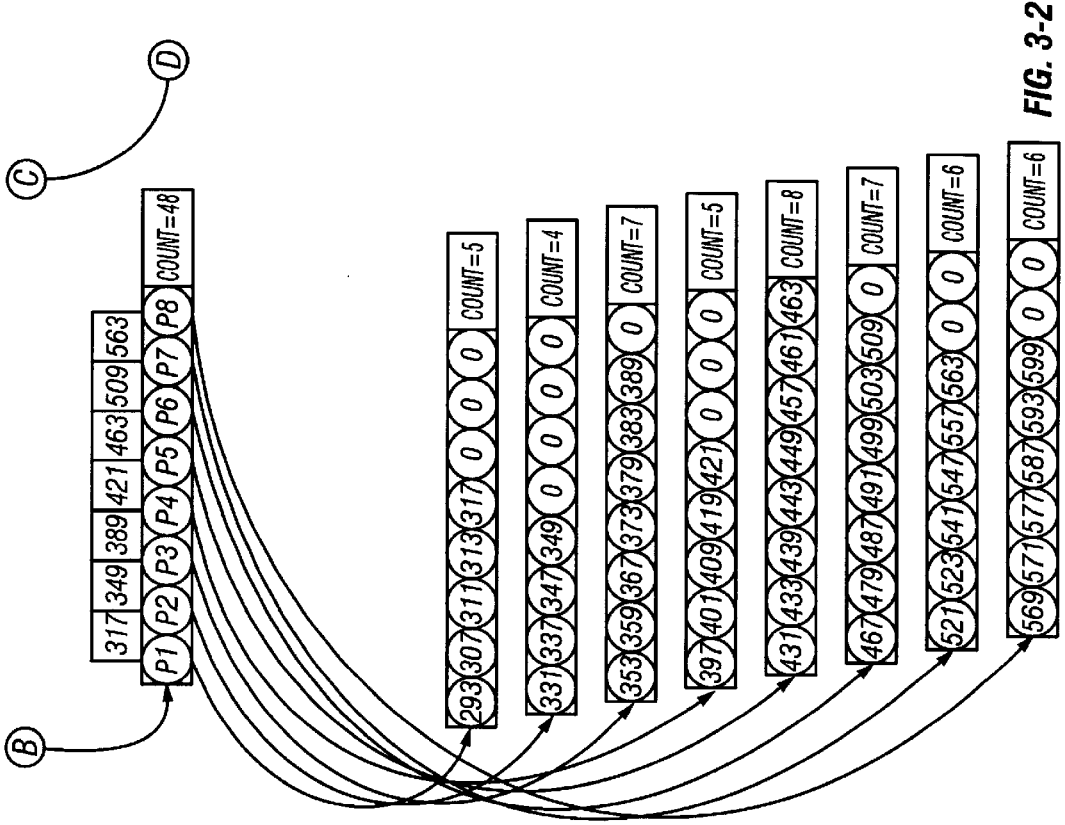
Figure 2:
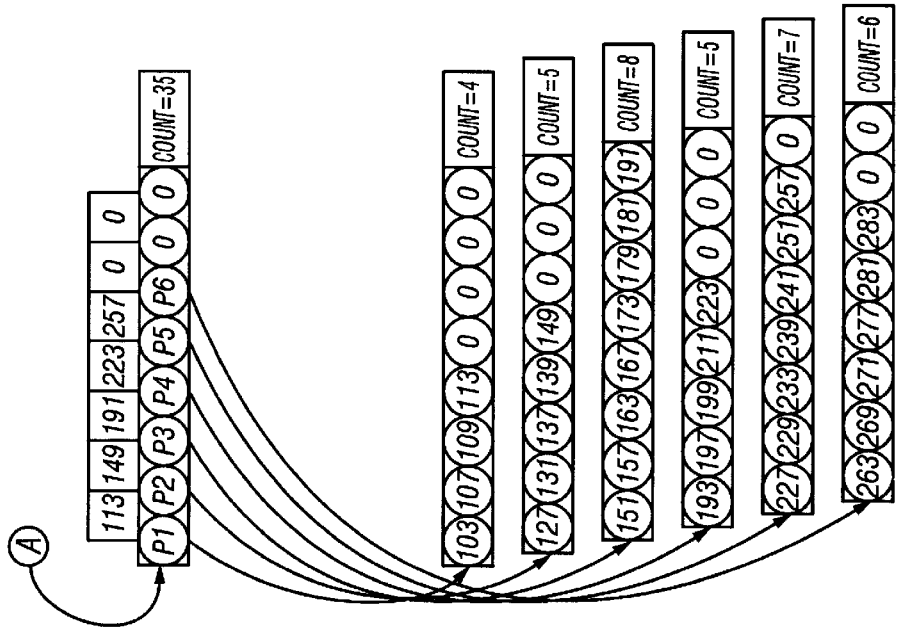

FIGS. 2-1, 2-2, and 2-3 is a diagram of a b-tree structure according to an alternate embodiment of the invention. This embodiment duplicates count values so that each node includes, not only count values of referenced substrees, but the total count for all subtrees. Thus, with reference to FIG. 2a, first level node 110a includes counts 121–125 for respective subtrees and includes a total count value 120.

Figure 3A:
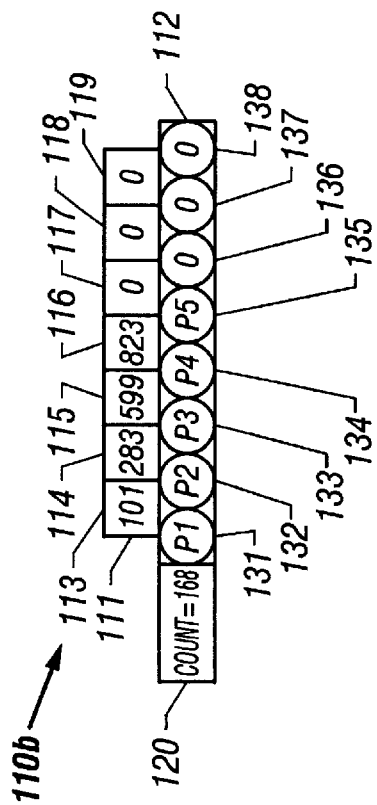
Figure 3:
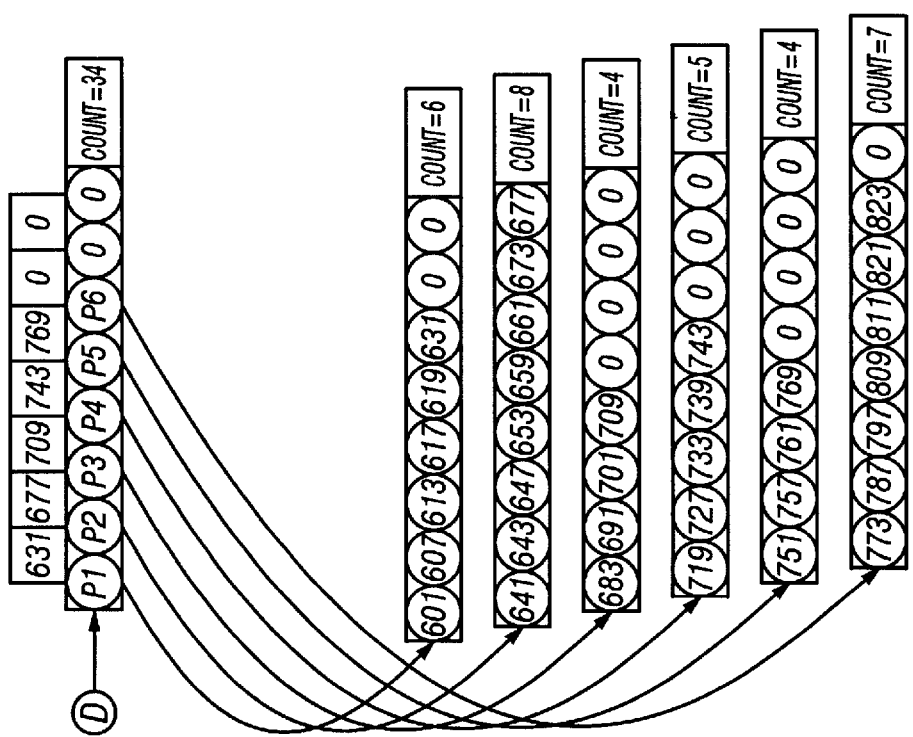

FIGS. 3-1, 3-2, and 3-3 is a diagram of another b-tree structure according to still a further embodiment of the invention in which a count of entries referenced by a node is included only at that node, i.e., there is no subdivision count indicating the individual counts contained in each subtree referenced. Thus, as shown in FIG. 3a, first level node 110b includes a count 120 indicating the total number of entries contained in subtrees referenced by pointers 131–135. This embodiment would therefore require an additional indication to determine the count values for each subtree.

Maintaining a count of the number of entries stored in each subtree referenced by a node provides for both the determination of the ordinality of a key and, conversely, access of the key based on its ordinality, without complete traversal of all leading (or trailing) keys. Instead, count values are accumulated during tree searching to obtain the ordinality of the target key or to access a key based on its ordinality.

Figure 4:
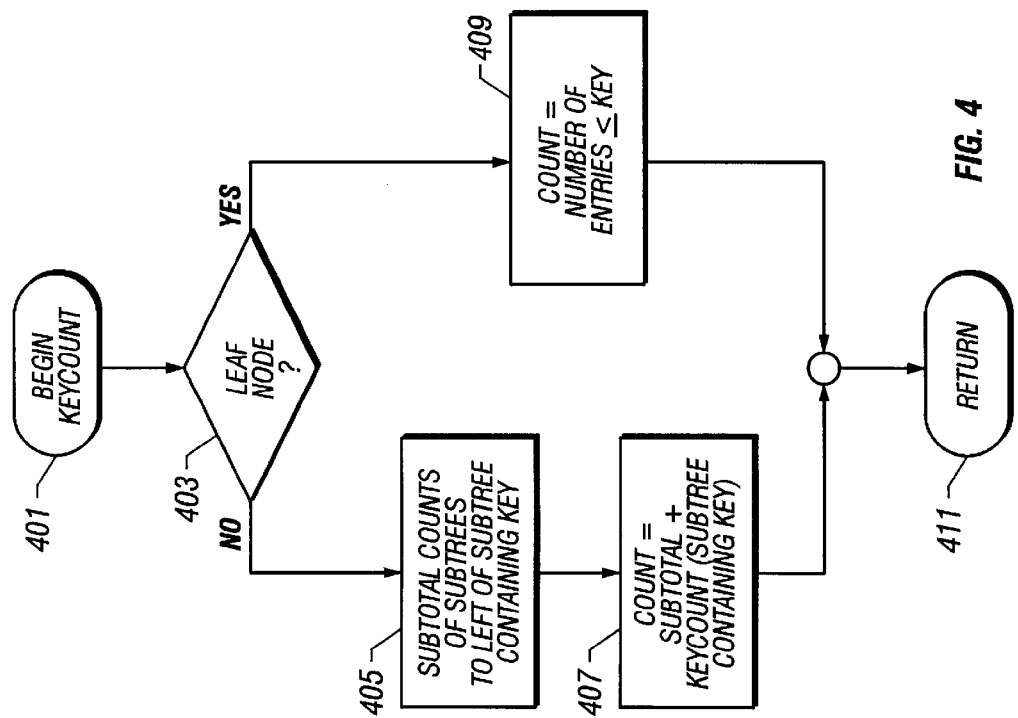
FIG. 4 is a flow chart of a recursive method of obtaining the ordinality of a key stored in a data structure according to the invention.

FIG. 4 is a flow diagram of a recursive routine for determining the ordinality of a key, i.e., the ordered position of the key in the tree. Upon initial entry of the Keycount routine at terminal 401, at step 403 the node being visited is examined to determine if it is a terminal leaf node. This test provides for recursion termination when there are no more nodes to be visited. In this case, the routine traverses the leaf node at step 409 to determine the ordinal position of the key (if found) or the number of keys less than the key if the key is not found. This value is then returned as the Keycount to the calling routine. Since the routine is recursive, the calling routine is typically an upper level of Keycount which will add the results to its findings, and execute its own return.

Thus, if Keycount is visiting an interior or root node, processing continues at step 405 where a subtotal is computed of the counts for all subtrees referenced by the node that have only keys less than the targeted key, i.e., have "expanses" that do not include and are less than the key. At step 407 Keycount "calls itself," adding the subtree subtotal to the result from traversal of the subtree including the key in its expanse, i.e., range of keys stored. That is, upon return from the called verion(s) of Keycount, the present Keycount has returned to it the count of entries less than or equal to the targeted key in that subtree. Keycount then adds to that value the count of any additional entries in the next level subtree that are less than the key, and returns that value to the calling routine at step 411.

Figure 5:
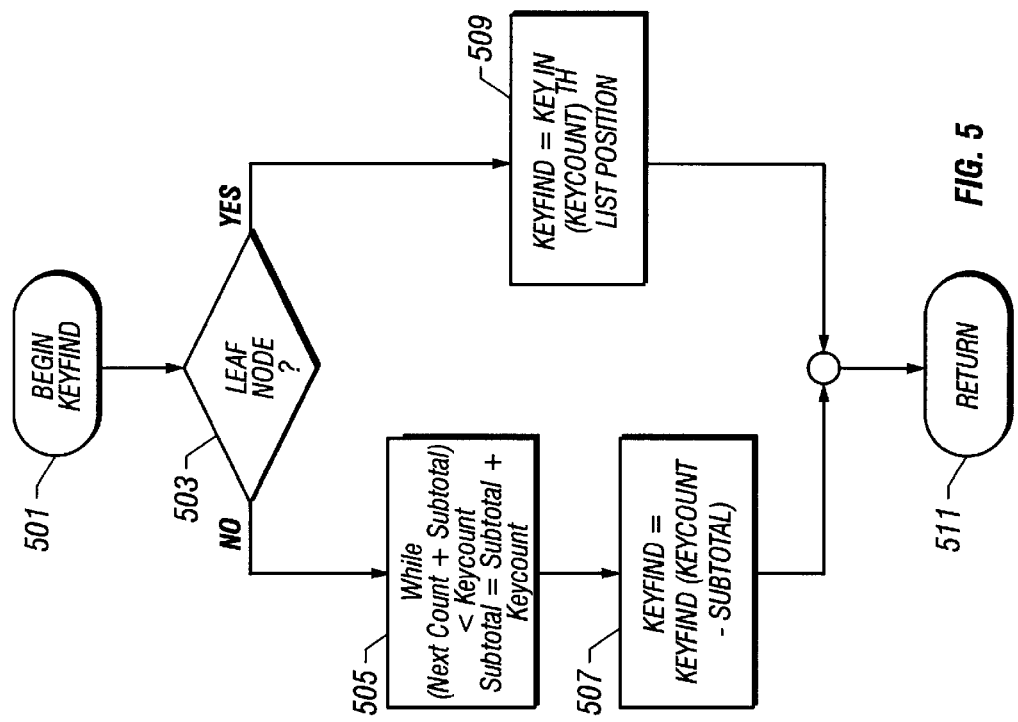
FIG. 5 is a flow chart of a recursive method of retrieving a key based on its ordinality as stored in a data structure according to the invention.

A flow chart for a "Keyfind" routine is given in FIG. 5. Keyfind is also recursive and provides for access to an entry based on its ordinality rather than its key value. Keyfind is entered by a calling routine at terminal 501 and recursive test 503 is used to determine if the node being visited is a terminal leaf node. If the current node is a leaf, the routine uses the count supplied by the calling routine at step 509 to index through the entries and return the key found at the count position at step 511. Conversely, if the node being visited is an interior or root node, at step 505 Keyfind computes the sum of all subtrees having counts which, when summed, are less than the requested count, i.e., all subtrees "to the left" of the subtree having an entry corresponding to the count supplied by the calling routine. To traverse this latter subtree (i.e., the subtree including the target ordinal entry), Keyfind calls itself, supplying the remainder of the count not accounted for by the subtrees to the left. The key value returned by the called version is then returned at step 511 to each calling version of Keyfind until all versions are completed and exited.

In addition to the Keycount and Keyfind routines, pseudo-code presented in Appendix A provides a nonrecursive function named Ordinal returning an ordinal value of a key and a recursive implementation of Keyfind named Findkey.

Figures 1, 6:
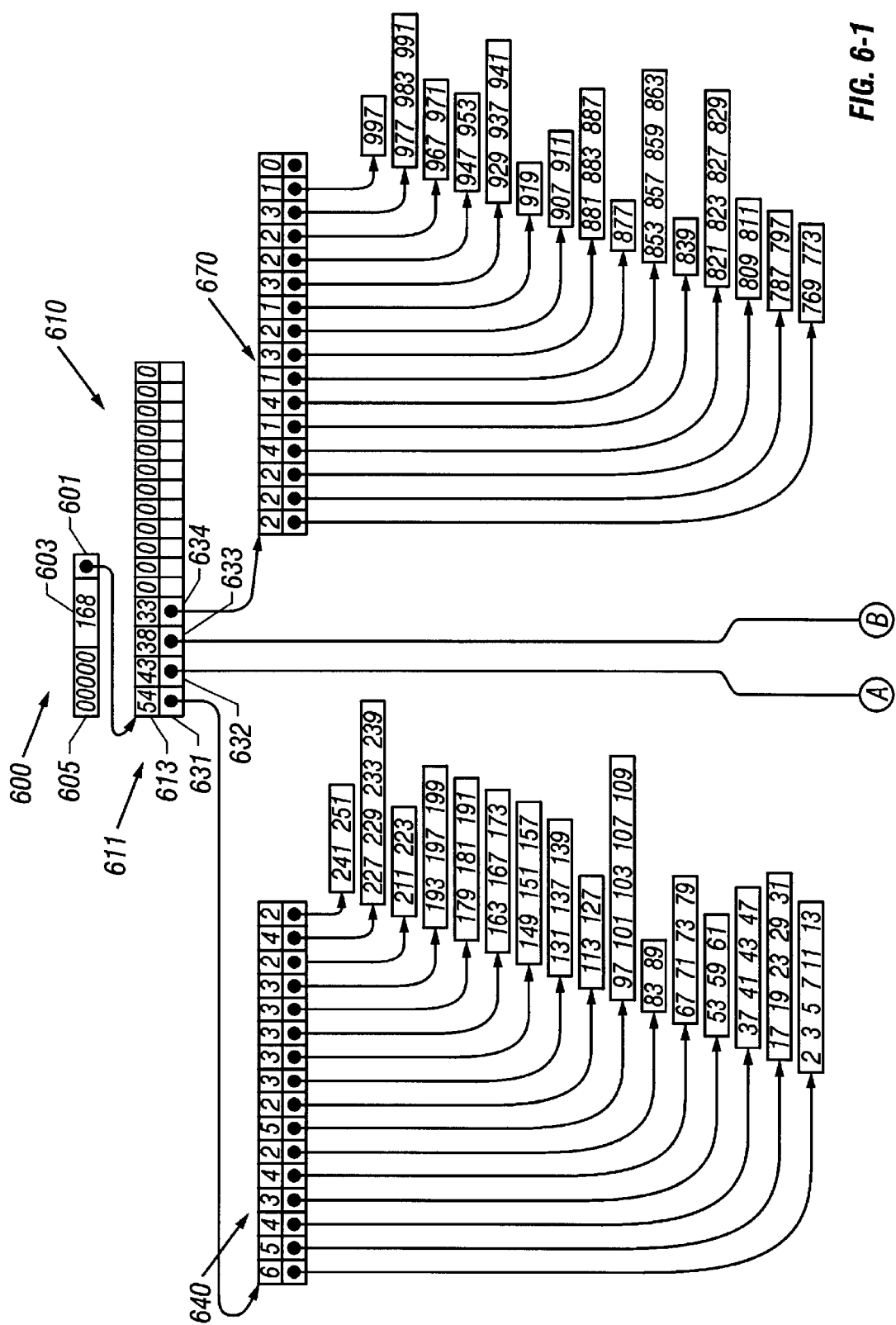
Figures 2, 6:
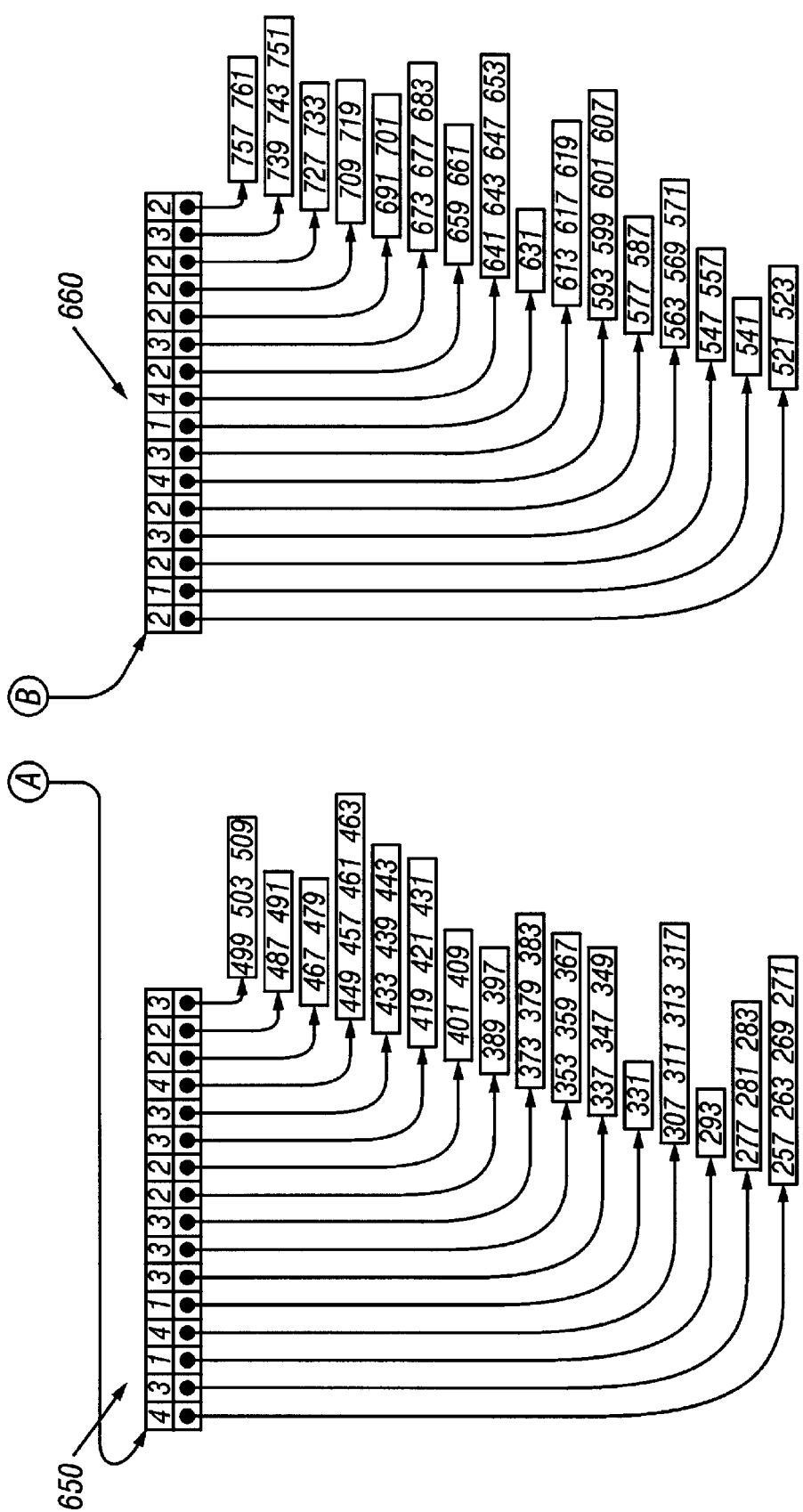

In addition to b-trees, the invention is applicable to, and may be used in combination with other hierarchical data structures. For example, FIGS. 6-1 and 6-2 is a diagram of a preferred embodiment of the invention applied to a hybrid "Judy" tree structure, the latter fully described in and by the previously referenced and incorporated pending U.S. patent application Ser. No. 09/457,164 entitled "A Fast, Efficient, Adaptive, Hybrid Tree". The algorithm and data structure contained in that patent application is also known as Judy. The Judy tree structure is augmented by the addition of count values for each subordinate structure referenced by a node. Thus, for example, root node 600 includes a pointer 601 to Judy node 610 and a count value 603 associated with the number of entries addressed by the pointer. Similarly, Judy nodes 613, 640, 650, 660 and 670 each associate a count with each pointer originating at those nodes. For example, pointer array 611 includes pointers 631, 632, 633 and 634 to respective lower level Judy nodes 640, 650, 660 and 670. Associated with each of these pointers are respective count values stored in count array 613, indicating the total number of entries referenced by each of the respective pointers.

As with the b-tree implementation, the Judy structure implementation supports counting to determine ordinality of keys and to determine the number of keys between ordinal values. For example, Appendix B contains an example C program code of a preferred implementation of Judy 1 Count( ). This routine returns the "count of Indexes" between (inclusively) the two limits by traversing the a "Digital tree" data structure. Thus, the routine determines an ordinal value for the specified keys to compute a population count present within the specified range.

Figure 7:
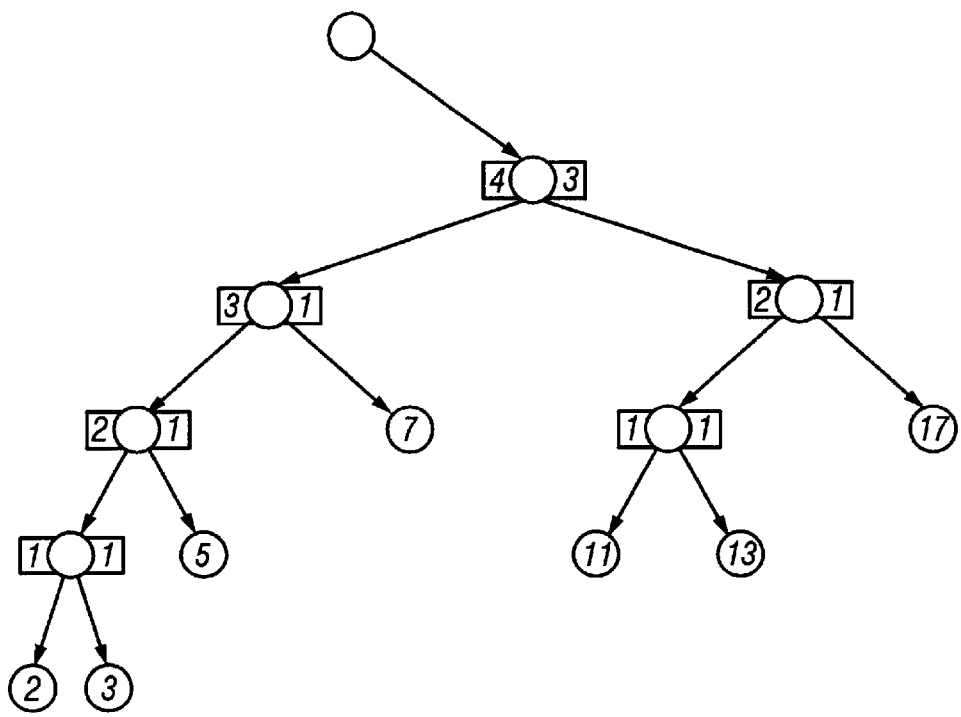
FIG. 7 is a diagram of a binary tree including key counts stored in respective subtree root nodes, each indicator associated with a number of keys present in respective left and right sub-subtrees.
Figure 8:
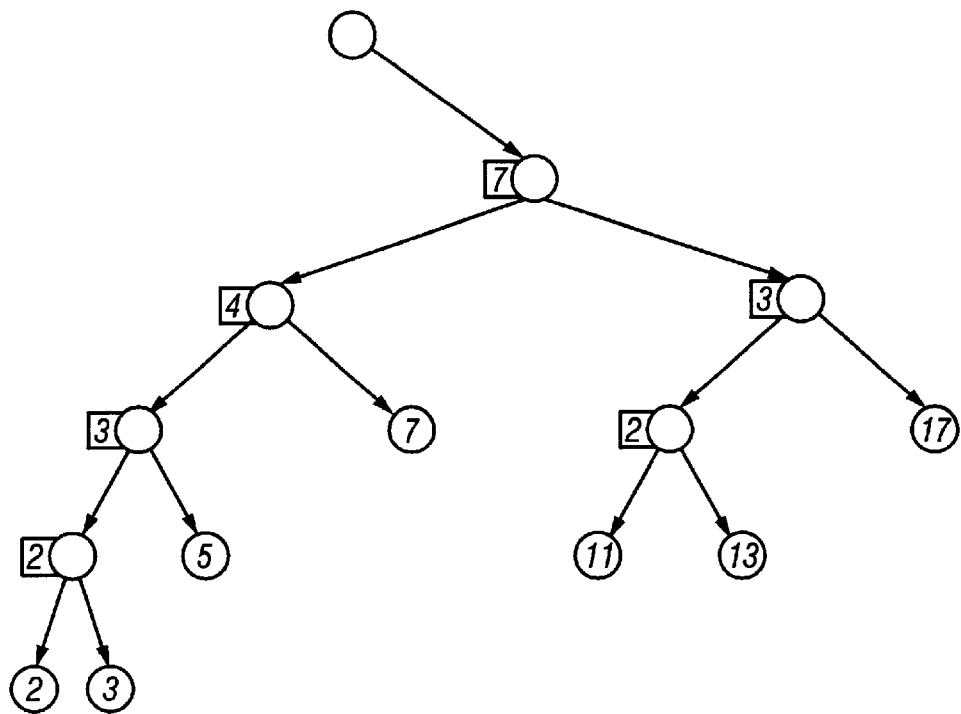
FIG. 8 is a diagram of a binary tree including key counts stored in respective subtree root nodes, each indicator associated with a number of keys present in the subtree.

FIGS. 7 and 8 are diagrams of binary trees according to the invention, in which each node includes a count of the number of keys addressed by the respective left and right pointers (FIG. 7) and wherein each node includes a total count of keys addressable by that node, but without allocation between subtrees (FIG. 8).

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 9:
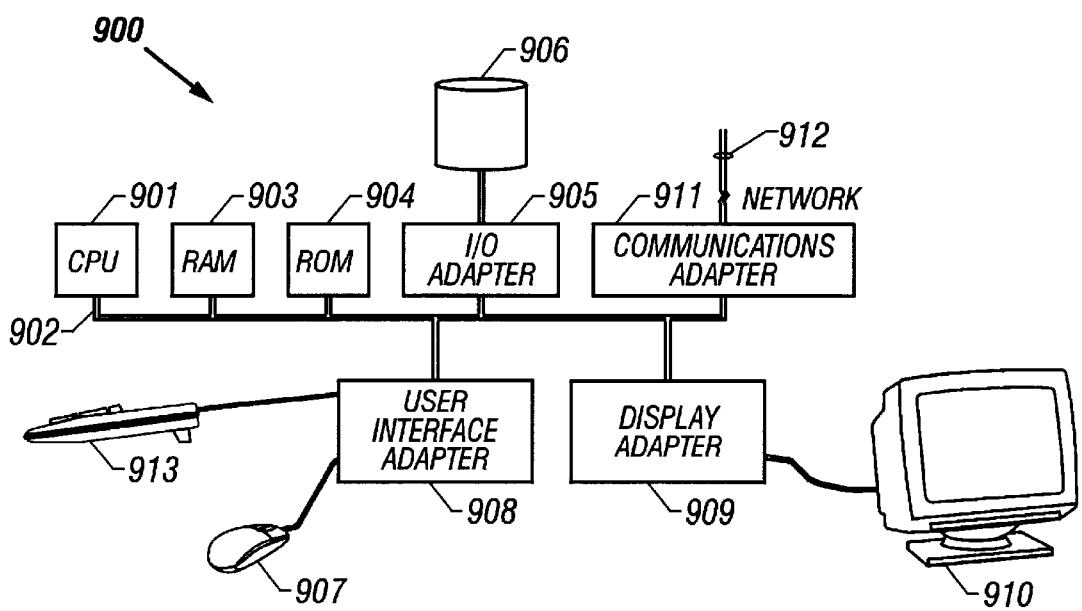
FIG. 9 is a block diagram of a computer system which is adapted to use the present invention.

FIG. 9 illustrates computer system 900 adapted to use the present invention. Central processing unit (CPU) 901 is coupled to system bus 902. The CPU 901 may be any general purpose CPU, such as an HP PA-8500 or Intel Pentium processor. However, the present invention is not restricted by the architecture of CPU 901 as long as CPU 901 supports the inventive operations as described herein. Bus 902 is coupled to random access memory (RAM) 903, which may be SRAM, DRAM, or SDRAM. ROM 904 is also coupled to bus 902, which may be PROM, EPROM, or EEPROM. RAM 903 and ROM 904 hold user and system data and programs as is well known in the art.

Bus 902 is also coupled to input/output (I/O) controller card 905, communications adapter card 911, user interface card 908, and display card 909. The I/O card 905 connects to storage devices 906, such as one or more of a hard drive, a CD drive, a floppy disk drive, a tape drive, to the computer system. Communications card 911 is adapted to couple the computer system 900 to a network 912, which may be one or more of a telephone network, a local (LAN) and/or a wide-area (WAN) network, an Ethernet network, and/or the Internet network. User interface card 908 couples user input devices, such as keyboard 913 and pointing device 907, to the computer system 900. The display card 909 is driven by CPU 901 to control the display on display device 910.

While illustrative and presently preferred embodiments of the invention have been described in detail herein, it is to be understood that the inventive concepts may be otherwise variously embodied and employed and that the appended claims are intended to be construed to include such variations except insofar as limited by the prior art. For example, the invention is applicable to a wide range of data structures and is not limited to either digital, b-trees or binary trees. Further, while the invention includes traversal of a data structure using count information stored throughout the structure to obtain ordinality of keys and entries, derive population counts over specified key ranges, and access and retrieve data based on key ordinality, the invention is not limited to these specific methods or uses of such count information or data structure. Additionally, while the term "root" node has been used to refer to an initial node of a tree, it is understood by those skilled in the art that a tree structure may be recursively defined and thereby decompose into a plurality of subtrees, each subtree having a "head" or "root" node that is an interior node of the larger tree.

APPENDIX A

| Code | Description |
|---|---|
| ORDINAL(ROOTPOINTER, FINDKEY): INTEGER | Return ordinal position of key in tree |
| BEGIN | |
|     COUNT = 0; | Initialize counter to accumulate count |
|     IF NODETYPE(ROOTPOINTER) = LEAF THEN BEGIN | If pointer is to leaf node, count leafs less than or equal to key |
|         WHILE (LEAFKEY <= FINDKEY) BEGIN | Step through leaf node until key found |
|             INCREMENT COUNT; | Increment count of keys <= target key |
|             IF MORELEAVES THEN NEXTLEAFKEY; | Advance to test next leaf if more leaves exist |
|         END WHILE | Exit while loop if key found or search finished |
|         IF LEAFKEY = FINDKEY THEN FOUND=TRUE; | If key found, set boolean FOUND to true |
|     ELSE BEGIN | If node points to subtrees, add count from subtrees outside expanse, recurse subtree having expanse including FINDKEY |

APPENDIX A-continued

| | |
|---|---|
| `WHILE (SUBTREEMAXKEY <= FINDKEY) BEGIN;` | Top of loop to scan subtrees outside expanse |
| `    COUNT = COUNT + TREECOUNT;` | Add subtree ordinality to total |
| `    IF MORESUBTREES THEN NEXTSUBTREE;` | Advance to test next subtree if one exists |
| `END WHILE;` | Exit While loop if all <= subtrees acounted for |
| `IF SUBTREEMAXKEY < FINDKEY THEN` | Reurse subtree if FINDKEY not found |
| `    COUNT = COUNT + ORDINAL(SUBTREE, FINDKEY)` | |
| `END ELSE;` | |
| `ORDINAL = COUNT;` | |
| `RETURN` | |
| `END ORDINAL` | |
| `FINDKEY(ROOTPOINTER, N):REAL` | |
| `BEGIN;` | |
| `    IF NODE.TYPE(ROOTPONTER) <> LEAF THEN BEGIN` | Return Nth key in tree |
| `LISTPOINTER = 1;` | Check to see if at interior node vice leaf |
| `COUNT = 0; NEXTCOUNT = COUNT(LISTPOINTER);` | Initialize list pointer to first entry in list |
| `DO WHILE (COUNT + NEXTCOUNT < N); BEGIN;` | Initialize local counter to zero |
| `    COUNT = COUNT + NEXTCOUNT;` | Traverse tree until count = N |
| `    LISTPOINTER = LISTPOINTER + 1;` | Add count of next to total |
| `    NEXTCOUNT = COUNT(LISTPOINTER);` | Advance to next node entry in list |
| `END DO` | Get next count value in list |
| `IF NODE.TYPE.NODEPOINTER = LEAF THEN N =` | Exit loop when next entry would exceed cnt |
| `COUNT = COUNT + FINDKEY(NODEPOINTER(LISTPOINTER),` | Call FINDKEY to traverse subtree |
| `    (N-COUNT);` | |
| `ELSE` | If not interior node, parse count leaves |
| `FINDKEY = KEY(COUNT);` | |
| `RETURN;` | Return |
| `END FINDKEY;` | |

APPENDIX B

```
//    INCLUDE FILES
#include   "Judy1.h"
/*
    Judy1Count () returns the "count of Indexes" between
    (inclusively) the two limits. It traverses the
    a "Digital tree" data structure. This Count code is
    the GENERIC untuned version (minimum code size).
*/
//    Proto for internal routine
static ulong_t
_JudyAi ( Pvoid_t, ulong_t, ulong_t);
ulong_t
Judy1Count
    (
    Pvoid_t   PJudy,        // Root Pointer to 1st Branch in tree
    ulong_t   I1,           // Starting Index
    ulong_t   I2            // Ending Index
    )
{
    ulong_t Asize;
    Slot_t Slot;
    PSlot_t PSlot;
    Slot   = (Slot_t) PJudy;    // For clarity - no code generated
//    Check if we have anything to do (Negative space?)
    if (I1 > I2) return(0L);
//    Check if the tree has been allocated
    if (Slot == 0L || Slot == cJU_NULL) { return (0L); }
//    Since there is not enough room for a "count" in the root pointer derive
//    the tree total population by counting all entrys in the 1st node
//    Is the root pointer point to a Node?
    if (JU_IS_BRANCH_PTR1 (Slot))
    {
//         Calculate the Judy Array Size
         PSlot = JU_SLOT_TO_COUNTER_POINTER1 (Slot);
         Asize  =  *PSlot++;
         Asize += *PSlot++;
         Asize += *PSlot++;
         Asize += *PSlot;
    }
//    Root pointer points to a linear sorted tree of Indexex
    else   // Must be a Leaf
    {
         Asize =   JU_SLOT_TO_FLWR_COLOR1 (Slot);
    }
```

APPENDIX B-continued

```
//      Got the total population of the Array
//      Leave out the special case of I1 == I2 for testing
//      if (I1 == I2) return ((Judy1Get (PJudy, I1) : 1L ? 0L);
//      Check for other special cases (algorithm by AJS)
        return (
                ((I1 ==   0L) ?         : _JudyAi (PJudy, I1,     Asize)) -
                Asize
                ((I2 == ~0L) ? 0L       : _JudyAi (PJudy, I2+1L,  Asize))
        );
}
/*
    This internal routine is called to determine the number of
    Indexes from the passed Index to the end (inclusive). No error
    checking because it is called after error checking is done in
    Judy1First ().
*/
static ulong_t
_JudyAi
    (
    Pvoid_t   PJudy,        // Root Pointer to 1st Branch in tree
    ulong_t   Index,        // Index or Key to lookup
    ulong_t   TotalIndexes  // Array Size
    )
{
    Slot_t    Slot;         // The Slot in current Branch
    PSlot_t   PSlot;        // The Slot in current Branch
    ulong_t   Digit;        // Offset into current Branch pointing to Slot
    ulong_t   SftIdx;       // Shifted Index to just relevant bits
    ulong_t   PosIdx;       // Current Leaf index
    ulong_t   ii;           // Total Indexes in tree
    SftIdx = Index;         // For clarity
//      Search and find the closest actual Index in the tree
        if (Judy1First (PJudy, &SftIdx) == cJU_FALSE) return (0L);
        Slot     = (Slot_t) PJudy;  // For clarity - no code generated
//      Traverse the tree until pointer is to a leaf
        while (JU_IS_BRANCH_PTR1 (Slot))
        {
//              Get next decoded Digit
                Digit  = JU_SFTIDX_TO_DIGIT1 (SftIdx);
//              Get the pointer to the Counter area
                PSlot = JU_SLOT_TO_COUNTER_POINTER1 (Slot);
//              Move down to next Level
                Slot  = *((PSlot_t) Slot + Digit);
//              Subtract Indexes below the requested one
                for (ii = 0L; ii < Digit; ii++)
                {
                    TotalIndexes -= *PSlot++;
                }
//              Shift out decoded Index bits
                JU_SFTIDX_DIGITS1 (SftIdx);
        }
//      Slot    : Is the Leaf pointer
//      SftIdx  : Is the Index to decode at this level
//      Change Leaf pointer to a normal pointer.
        PSlot = JU_SLOT_TO_FLWR_POINTER1 (Slot);
//      Search Leaf for the required matching Index
        PosIdx = 0L;
        do
        {
                if (SftIdx == *(PSlot + PosIdx))
                {
                        return(TotalIndexes - PosIdx);
                }
        } while (++PosIdx);
//      Not a possible return, since Index was found by Judy1First ()
}
```

What is claimed is:

1. A method of storing data in a computer memory comprising the steps of:

storing ordered sets of keys into a plurality of data structures;

storing addresses of said data structures in a root node;

storing, in association with each of said addresses, counts of ones of said keys in each of said data structures; and determining a first ordinality of one of said keys.

2. The method according to claim 1 wherein said determining further comprises adding at least one of said counts to a second ordinality of said one key, said second ordinality determined with respect to others of said keys commonly stored in one of said data structures.

3. The method according to claim 1 wherein said data structures include at least one first level data structure referencing a plurality of second level data structures, said method further comprising a step of distributing said keys among said plurality of second data structures and storing in said first level data structure counts of said keys in each of said second level data structures.

4. The method according to claim 1 further comprising a step of storing said keys in a digital tree structure.

5. A computer memory for storing data for access by an application program being executed on a data processing system, comprising:

a hierarchical data structure stored in said memory, said data structure storing an ordered set of keys and comprising a root node and a plurality of first level data structures, a subset of said ordered set of keys uniquely associated with respective ones of said first level data structures; and each of said first level data structures having associated therewith a count value representing a number of entries of an associated one of said subsets.

6. The computer memory according to claim 5 wherein said hierarchical data structure comprises a digital tree.

7. The computer memory according to claim 5 wherein said hierarchical data structure comprises one of a b-tree and a binary tree.

8. The computer memory according to claim 5 wherein said count values are stored in said memory in association with said root node.

9. The computer memory according to claim 5 wherein said root node includes addresses of each of said first level data structures.

10. The computer memory according to claim 9 wherein each of said addresses is stored in said memory in association with said root node as a pointer originating at said root node and terminating at a respective one of said first level data structures.

11. The computer memory according to claim 5 wherein each of said first level structures further include a plurality of directors to respective second level data structures.

12. The computer memory according to claim 5 wherein said first level data structures include interior nodes referencing other nodes and leaf nodes referencing said keys.

13. A computer memory for storing data for access by an application program being executed on a data processing system, comprising:

a hierarchical data structure stored in said memory, said data structure storing an ordered set of keys and comprising a head node addressing each of a first plurality of first level data structures, each of said first level data structures addressing respective pluralities of second level data structures;

first level nodes of said ordered set of keys uniquely associated with respective ones of said first level data structures;

second level nodes each uniquely associated with respective ones of said second level data structures; and each of said first and second level data structures having associated therewith a count representing a number of said keys stored in respective ones of said structures.

14. The computer memory according to claim 13 wherein said hierarchical data structure comprises a digital tree.

15. The computer memory according to claim 13 wherein said hierarchical data structure comprises one of a b-tree and a binary tree.

16. The computer memory according to claim 13 wherein each of said first level nodes includes references to at least two of said second level nodes.

17. The computer memory according to claim 16 wherein said counts are associated with a number of said keys referenced by respective ones of said references.

18. The computer memory according to claim 16 wherein each of said first level nodes has associated therewith one of said counts, each of said counts representing a total number of said keys associated with respective ones of said at least two second level nodes referenced by respective ones of said first level nodes.

19. The computer memory according to claim 16 wherein said references comprise addresses of said second level nodes in said memory.

20. The computer memory according to claim 16 wherein said first level nodes are interior to said data structure and said second level nodes each comprise one of interior and terminal leaf nodes.

* * * * *